R. GILLILAND.
NUT LOCK.
No. 107,609. Patented Sept. 20, 1870
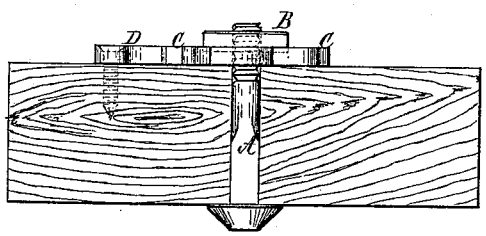
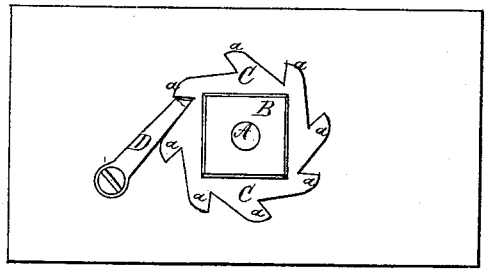

United States Patent Office.

ROBERT GILLILAND, OF HUDSON, MICHIGAN.

Letters Patent No. 107,609, dated September 20, 1870.

IMPROVEMENT IN NUT-LOCKS.

The Schedule referred to in these Letters Patent and making part of the same

To all whom it may concern:

Be it known that I, ROBERT GILLILAND, of Hudson, in the county of Lenawee and State of Michigan, have invented certain new and useful Improvements in Nut-Locks; and I do hereby declare that the following is a full, clear, and exact description thereof, reference being had to the accompanying drawing and to the letters of reference marked thereon which form a part of this specification.

The nature of my invention consists in the construction and arrangement of a "nut-lock," as will be hereinafter fully set forth.

In order to enable others skilled in the art to which my invention appertains to make and use the same, I will now proceed to describe its construction and operation, referring to the annexed drawing, in which—

Figure 1 is a longitudinal vertical section, and
Figure 2 is a plan view.

A represents the bolt, and B the nut, both constructed in the usual manner.

C is the washer, which is provided, on its upper side, with a recess, of the same shape and size as the under or inner side of the nut B, so that the nut may fit in the same, when screwed down, and, consequently, it will become impossible for the nut to loosen unless the washer should turn with the nut for a short distance.

To prevent the washer C from turning, and thus loosening the nut, it is, on its outside circumference, provided with a series of hooked teeth, *a a*, and a pawl, D, pivoted on the timber, engages in one of said teeth, and prevents the washer from turning.

The notches or teeth *a a* being made hooking, it will be observed that the dog or pawl D cannot be loosened until the nut and washer are turned a little ahead, which is an additional safeguard against the loosening of the nut by jarring, &c.

Having thus fully described my invention,

What I claim as new, and desire to secure by Letters Patent, is—

1. The combination of the recessed and toothed washer C and dog or pawl D, constructed and operating substantially as and for the purposes herein set forth.

2. The combination of the bolt A, nut B, recessed and toothed washer C, and dog or pawl D, all constructed and arranged substantially as and for the purposes herein set forth.

In testimony that I claim the foregoing as my own, I affix my signature in presence of two witnesses.

ROBT. GILLILAND.

Witnesses:
LORENZO PALMER,
JOS. M. BROKAW.